United States Patent
Eyama

(10) Patent No.: US 10,951,838 B2
(45) Date of Patent: Mar. 16, 2021

(54) IMAGE PROCESSING DEVICE, IMAGING DEVICE, AND IMAGING METHOD

(71) Applicant: SONY SEMICONDUCTOR SOLUTIONS CORPORATION, Kanagawa (JP)

(72) Inventor: Tamaki Eyama, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 202 days.

(21) Appl. No.: 15/512,610

(22) PCT Filed: Jul. 6, 2015

(86) PCT No.: PCT/JP2015/069376
§ 371 (c)(1),
(2) Date: Mar. 20, 2017

(87) PCT Pub. No.: WO2016/056279
PCT Pub. Date: Apr. 14, 2016

(65) Prior Publication Data
US 2017/0295326 A1    Oct. 12, 2017

(30) Foreign Application Priority Data
Oct. 6, 2014   (JP) .............................. JP2014-205509

(51) Int. Cl.
*H04N 5/33*   (2006.01)
*H04N 5/353*  (2011.01)
(Continued)

(52) U.S. Cl.
CPC .......... *H04N 5/332* (2013.01); *H04N 5/2352* (2013.01); *H04N 5/2354* (2013.01);
(Continued)

(58) Field of Classification Search
CPC ............................ H04N 5/332; H04N 5/2352
(Continued)

(56) References Cited

U.S. PATENT DOCUMENTS

| | | | |
|---|---|---|---|
| 2015/0255021 A1* | 9/2015 | Wu ...................... | G09G 3/3426 345/83 |
| 2015/0312541 A1* | 10/2015 | Usui ..................... | H04N 9/045 348/164 |

(Continued)

FOREIGN PATENT DOCUMENTS

| | | |
|---|---|---|
| JP | 2008-289000 A | 11/2008 |
| JP | 2011-082859 A | 4/2011 |
| JP | 2013-115679 A | 6/2013 |

*Primary Examiner* — Amir Shahnami
(74) *Attorney, Agent, or Firm* — Chip Law Group

(57) ABSTRACT

An information processing device that includes an exposure control unit alternately repeats a first frame and a second frame. An infrared light irradiation control unit performs irradiation of infrared light in a predetermined infrared light irradiation period which is equal to or less than an aggregate period of the first frame and the second frame. An image signal acquisition unit acquires a first image signal which is the image signal in the first frame and a second image signal which is the image signal in the second frame. An extraction unit extracts a visible light intensity per unit time and an infrared light intensity per unit time from the first image signal and the second image signal. A generation unit generates an image signal corresponding to visible light and an image signal corresponding to the infrared light.

9 Claims, 12 Drawing Sheets

(51) Int. Cl.
*H04N 5/235* (2006.01)
*H04N 9/07* (2006.01)
*H04N 9/78* (2006.01)

(52) U.S. Cl.
CPC ............. *H04N 5/3532* (2013.01); *H04N 9/07* (2013.01); *H04N 9/78* (2013.01)

(58) Field of Classification Search
USPC ........................................................ 348/164
See application file for complete search history.

(56) References Cited

U.S. PATENT DOCUMENTS

| | | | | |
|---|---|---|---|---|
| 2016/0065823 | A1* | 3/2016 | Katoh | H04N 5/2353 348/366 |
| 2016/0065926 | A1* | 3/2016 | Nonaka | H04N 5/2351 348/164 |

* cited by examiner

IMAGE PROCESSING DEVICE, IMAGING DEVICE, AND IMAGING METHOD

CROSS REFERENCE TO RELATED APPLICATIONS

This application is a U.S. National Phase of International Patent Application No. PCT/JP2015/069376 filed on Jul. 6, 2015, which claims priority benefit of Japanese Patent Application No. JP 2014-205509 filed in the Japan Patent Office on Oct. 6, 2014. Each of the above-referenced applications is hereby incorporated herein by reference in its entirety.

TECHNICAL FIELD

The present technology relates to an image processing device, an imaging device, and an imaging method. In particular, the present technology relates to an image processing device and an imaging device used in a camera having a color night view function, an imaging method therefor, and a program causing a computer to perform the method.

BACKGROUND ART

In the related art, cameras such as monitoring cameras used at night include pixels corresponding to visible light and infrared light. An image sensor outputting an image signal including the visible light and the infrared light is used. In the image signal output by the image sensor, an infrared light signal is added to a visible light signal. Thus, a signal level is higher than in the image sensor outputting only a visible light signal. Therefore, an image with excellent visibility can be obtained even in a low luminance environment such as night. However, since the infrared light signal is added to the visible light signal, an obtained image is an image with inferior color reproducibility. Accordingly, imaging devices that temporarily separate the visible light signal and the infrared light signal from the image signal including the visible light and the infrared light, mix the visible light signal and the infrared light signal based on a predetermined ratio, and obtain an image signal according to a use such as visibility emphasis or color reproducibility emphasis have been proposed. A method of separating the visible light signal and the infrared light signal through image signal calculation has been proposed as a method of separating the visible light signal and the infrared light signal from an image signal including the visible light and the infrared light (for example, see Patent Literature 1).

CITATION LIST

Patent Literature

Patent Literature 1: JP 2008-289000A

DISCLOSURE OF INVENTION

Technical Problem

In the above-described technology of the related art, an image sensor including four kinds of pixels is used. The pixels include four pixels, a pixel ($R_{+IR}$ pixel) corresponding to red light and infrared light, a pixel ($G_{+IR}$ pixel) corresponding to green light and infrared light, a pixel ($B_{+IR}$ pixel) corresponding to blue light and infrared light, and a pixel ($W_{+IR}$ pixel) corresponding to white light and infrared light. Then, a visible light signal and an infrared light signal are separated from an image signal including visible light (red light, green light, blue light, and white light) and infrared light output from the image sensor. This is performed through the following calculation:

$$(R_{+IR}+G_{+IR}+B_{+IR}-W_{+IR})/2=IR;$$

$$R_{+IR}-IR=R;$$

$$G_{+IR}-IR=G; \text{ and}$$

$$B_{+IR}-IR=B,$$

where IR, R, G and B indicate an infrared light signal (IR signal), a red light signal (R signal), a green light signal (G signal), and a blue light signal (B signal), respectively. Also, $R_{+IR}$ indicates an image signal ($R_{+IR}$ signal) formed by red light and infrared light. $G_{+IR}$ indicates an image signal ($G_{+IR}$ signal) formed by green light and infrared light. $B_{+IR}$ indicates an image signal ($B_{+IR}$ signal) formed by blue light and infrared light. $W_{+IR}$ indicates an image signal ($W_{+IR}$ signal) formed by white light and infrared light. The $R_{+IR}$ signal, the $G_{+IR}$ signal, the $B_{+IR}$ signal, and the $W_{+IR}$ signal are output signals of an $R_{+IR}$ pixel, a $G_{+IR}$ pixel, a $B_{+IR}$ pixel, and a $W_{+IR}$ pixel, respectively. In this way, in the technology of the related art, the infrared light signal (IR signal) and the visible light signals (R, G and B signals) are separated through calculation of the $W_{+IR}$ signal and the other image signals ($R_{+IR}$, $G_{+IR}$, and $B_{+IR}$ signals).

However, while the signals can be separated through simple calculation in a technique of the technology of the related art, a difference in spectral characteristics of infrared light between a $W_{+IR}$ pixel and other pixels is not considered. Therefore, there is a problem. Specifically, when imaging in which an amount of infrared light is large is performed, for example, imaging is performed while performing infrared light irradiation, an error based on the difference in the spectral characteristics increases. For this reason, there is a problem that visible light and infrared light may not be appropriately separated.

The present technology is devised in view of such a situation and an object of the present technology is to appropriately separate visible light and infrared light from an image signal formed by the visible light and the infrared light even when imaging is performed while performing the infrared light irradiation.

Solution to Problem

The present technology is devised to resolve the above-described problem. According to a first aspect of the present technology, there is provided an image processing device including: an exposure control unit configured to control the timing from exposure start to exposure stop of an image sensor outputting an image signal of a subject and alternately repeat a first frame in which an exposure time is set to a predetermined first exposure time and a second frame in which the exposure time is set to a second exposure time longer than the first exposure time; an infrared light irradiation control unit configured to irradiate the subject with infrared light in a predetermined infrared light irradiation period which is shorter than or equal to an aggregate period of the first and second frames; an image signal acquisition unit configured to acquire a first image signal which is the image signal in the first frame and a second image signal which is the image signal in the second frame; an extraction unit configured to extract a visible light intensity per unit time and an infrared light intensity per unit time from the first and second image signals; and a generation unit configured to generate an image signal corresponding to visible light and an image signal corresponding to the infrared light based on the extracted visible light intensity per unit time and the extracted infrared light intensity per unit time. Thus, it is possible to obtain an operational effect of extracting the visible light intensity per unit time and the infrared light intensity per unit time from the first and second image signals and generating the image signal corresponding to the visible light and the image signal corresponding to the infrared light based on the extracted visible light intensity per unit time and the extracted infrared light intensity per unit time.

Also, according to the first aspect of the present technology, when a period in which an exposure period overlaps the infrared light irradiation period in the first frame is a first infrared light irradiation period and a period in which the exposure period overlaps the infrared light irradiation period in the second frame is a second infrared light irradiation period, a ratio of the first exposure time to the first infrared light irradiation period may be different from a ratio of the second exposure time to the second infrared light irradiation period. Thus, it is possible to obtain an operational effect in which the ratio of the first exposure time to the first infrared light irradiation period is different from the ratio of the second exposure time to the second infrared light irradiation period.

Also, according to the first aspect of the present technology, the image processing device may further include: a conversion unit configured to convert the image signal corresponding to the visible light into a luminance signal and a color signal; and a correction unit configured to correct the luminance signal and the color signal in accordance with the image signal corresponding to the infrared light. Thus, it is possible to obtain an operational effect of correcting the luminance signal and the color signal in accordance with the image signal corresponding to the infrared light.

Also, according to the first aspect of the present technology, the image signal of the subject may include an image signal corresponding to red light and the infrared light, an image signal corresponding to green light and the infrared light, and an image signal corresponding to blue light and the infrared light. A separation unit may separate the image signal corresponding to the infrared light, an image signal corresponding to the red light, an image signal corresponding to green light, and an image signal corresponding to blue light. Thus, it is possible to obtain an operational effect of separating the image signal corresponding to the infrared light, the image signal corresponding to the red light, the image signal corresponding to the green light, and the image signal corresponding to the blue light.

Also, according to the first aspect of the present technology, the image sensor may further include an image signal corresponding to white light and the infrared light. The separation unit may separate the image signal corresponding to the infrared light, an image signal corresponding to red light, an image signal corresponding to green light, an image signal corresponding to blue light, and an image signal corresponding to the white light. Thus, it is possible to obtain an operational effect of separating the image signal corresponding to the infrared light, the image signal corresponding to the red light, the image signal corresponding to the green light, the image signal corresponding to the blue light, and the image signal corresponding to the white light.

Also, according to a second aspect of the present technology, there is provided an imaging device that includes: an image processing device including an image sensor configured to output an image signal of a subject, an infrared light irradiation unit configured to irradiate the subject with infrared light, an exposure control unit configured to control the timing from exposure start to exposure stop of the image sensor and to alternately repeat a first frame in which an exposure time is set to a predetermined first exposure time and a second frame in which the exposure time is set to a second exposure time longer than the first exposure time, an infrared light irradiation control unit configured to cause the infrared light irradiation unit to irradiate the subject with infrared light in a predetermined infrared light irradiation period which is shorter than or equal to an aggregate period of the first and second frames, an image signal acquisition unit configured to acquire a first image signal which is the image signal in the first frame and a second image signal which is the image signal in the second frame, an extraction unit configured to extract a visible light intensity per unit time and an infrared light intensity per unit time from the first and second image signals, and a generation unit configured to generate an image signal corresponding to visible light and an image signal corresponding to the infrared light based on the extracted visible light intensity per unit time and the extracted infrared light intensity per unit time. Thus, it is possible to obtain an operational effect of extracting the visible light intensity per unit time and the infrared light intensity per unit time from the first and second image signals and generating the image signal corresponding to the visible light and the image signal corresponding to the infrared light based on the extracted visible light intensity per unit time and the extracted infrared light intensity per unit time.

Also, according to a third aspect of the present technology, there is provided an imaging method including: an exposure control procedure of controlling the timing from exposure start to exposure stop of an image sensor outputting an image signal of a subject and alternately repeating a first frame in which an exposure time is set to a predetermined first exposure time and a second frame in which the exposure time is set to a second exposure time longer than the first exposure time; an infrared light irradiation control procedure of irradiating the subject with infrared light in a predetermined infrared light irradiation period which is shorter than or equal to an aggregate period of the first and second frames; an image signal acquisition procedure of acquiring a first image signal which is the image signal in the first frame and a second image signal which is the image signal in the second frame; an extraction procedure of extracting a visible light intensity per unit time and an infrared light intensity per unit time from the first and second image signals; and a generation procedure of generating an image signal corresponding to visible light and an image signal corresponding to the infrared light based on the extracted visible light intensity per unit time and the extracted infrared light intensity per unit time. Thus, it is possible to obtain an operational effect of extracting the visible light intensity per unit time and the infrared light intensity per unit time from the first and second image signals and generating the image signal corresponding to the visible light and the image signal corresponding to the infrared light based on the extracted visible light intensity per unit time and the extracted infrared light intensity per unit time.

Advantageous Effects of Invention

According to the present technology, it is possible to obtain the good effect of appropriately separating visible light and infrared light from an image signal formed by the visible light and the infrared light even when imaging is performed while performing the infrared light irradiation. In addition, note that the effects described above are not necessarily limitative and any one of the effects described in the present disclosure may be achieved.

MODE(S) FOR CARRYING OUT THE INVENTION

Hereinafter, modes for carrying out the present technology (hereinafter referred to as embodiments) will be described. The description will be made in the following order.

1. First embodiment (example of case in which periods of first and second frames are identical)
2. Second embodiment (example of case in which periods of first and second frames are different)
3. Modification examples 1. First Embodiment

[Example of Configuration of Imaging Device]

Figure 1:
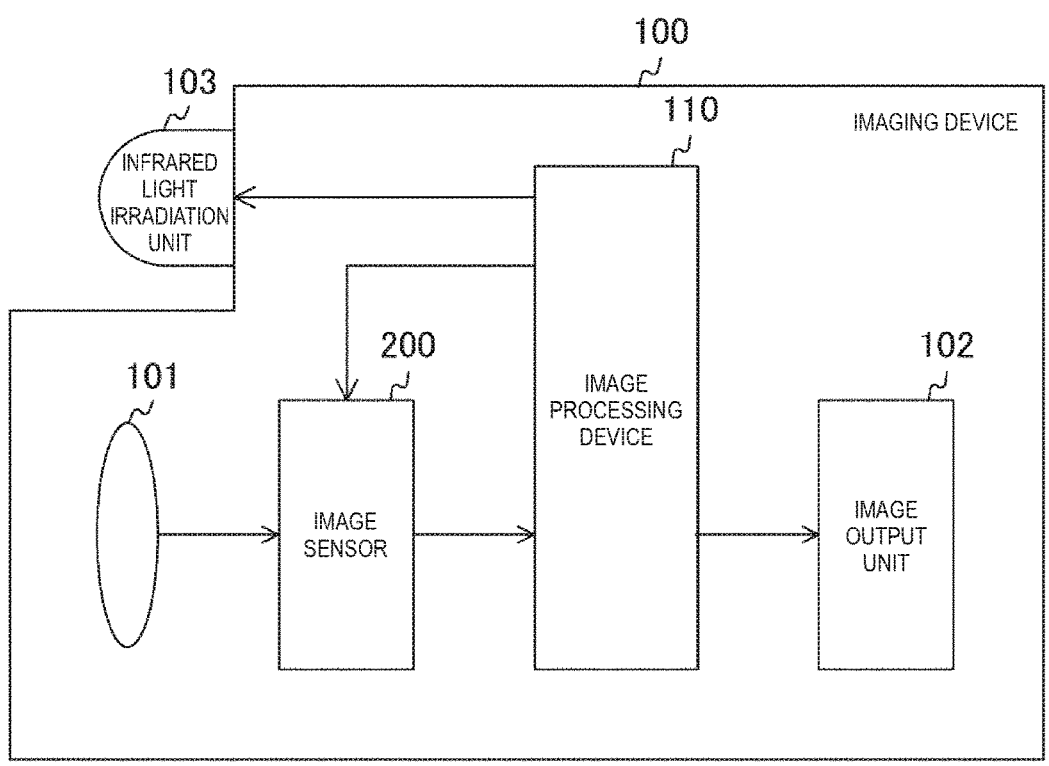
FIG. 1 is a diagram illustrating an example of a configuration of an imaging device 100 according to a first embodiment of the present technology.

FIG. 1 is a diagram illustrating an example of a configuration of an imaging device 100 according to a first embodiment of the present technology. The imaging device 100 includes a lens 101, an image output unit 102, an infrared light irradiation unit 103, an image processing device 110, and an image sensor 200.

The lens 101 forms an optical image of a subject in the image sensor 200. The image sensor 200 converts the optical image formed by the lens 101 into an image signal and outputs the image signal. Also, in the image sensor 200, pixels generating an image signal on a surface on which an optical image is formed are disposed 2-dimensionally. The pixels include the above-described $R_{+IR}$, $G_{+IR}$, $B_{+IR}$, and $W_{+IR}$ pixels. A technique for disposing the $W_{+IR}$ pixels in a checkered pattern and disposing the other pixels therebetween as disposition of the pixels can be used. The image sensor 200 contains an A/D converter and outputs an image signal converted into a digital signal. The image signal includes the above-described $R_{+IR}$, $G_{+IR}$, $B_{+IR}$, and $W_{+IR}$ signals.

The image sensor 200 outputs an image signal equivalent to one screen according to a predetermined frame frequency. In the first embodiment of the present technology, a frame in which an exposure time is short (first frame) and a frame in which the exposure time is long (second frame) are alternately repeated. These frames will be described below.

The image processing device 110 processes the image signal output from the image sensor 200 and outputs the processed image signal. Also, the image processing device 110 controls overall operation of the imaging device 100. The image output unit 102 outputs the image signal output from the image processing device 110 to the outside of the imaging device 100. The infrared light irradiation unit 103 irradiates the subject with infrared light. The infrared light irradiation unit 103 is controlled by the image processing device 110.

[Configuration of Image Processing Device]

Figure 2:
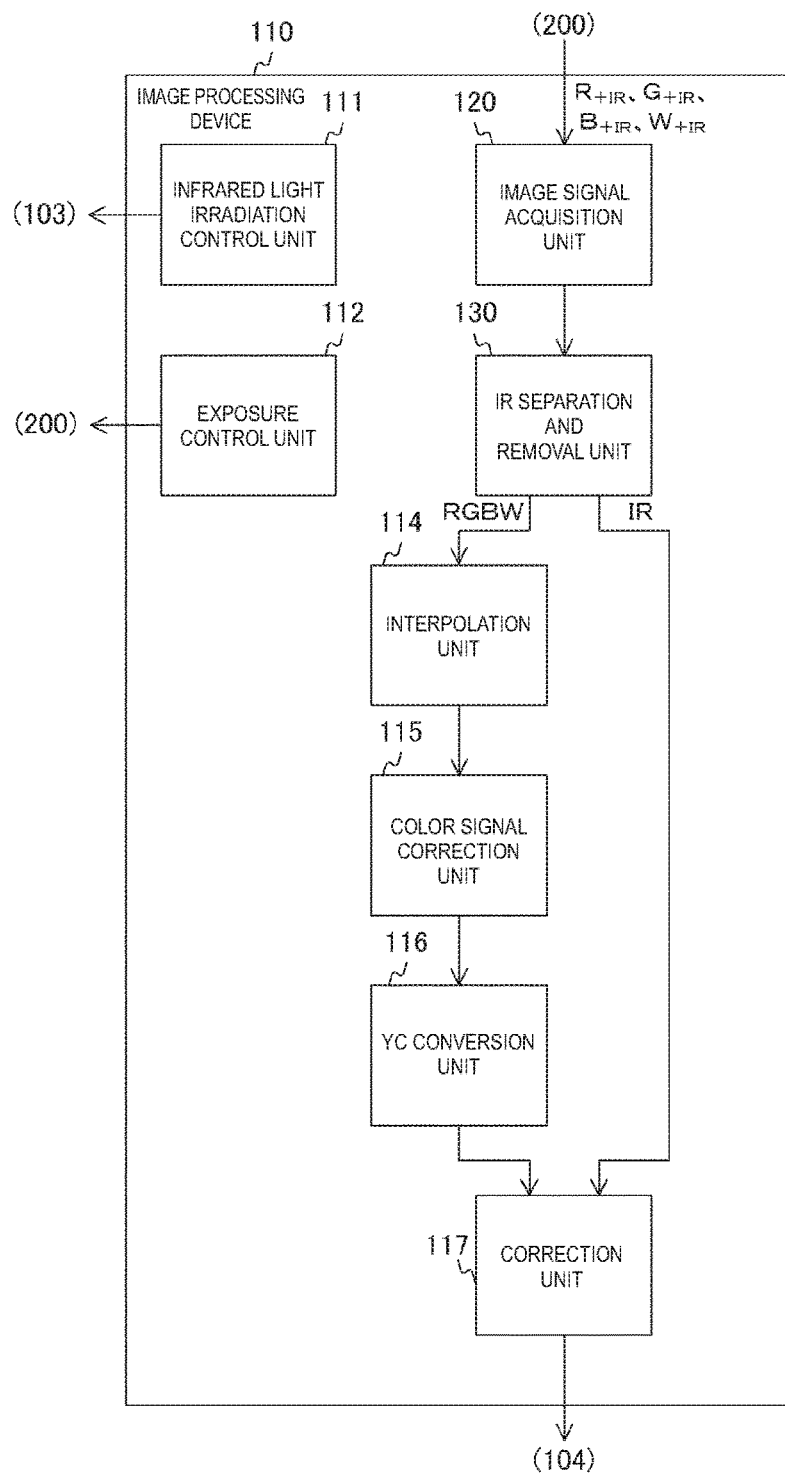
FIG. 2 is a diagram illustrating an example of a configuration of an image processing device 110 according to the first embodiment of the present technology.

FIG. 2 is a diagram illustrating an example of a configuration of an image processing device 110 according to the first embodiment of the present technology. The image processing device 110 includes an infrared light irradiation control unit 111, an exposure control unit 112, an image signal acquisition unit 120, an IR separation and removal unit 130, an interpolation unit 114, a color signal correction unit 115, a YC conversion unit 116, and a correction unit 117. In addition, the image signal acquisition unit 120 will be described below.

The infrared light irradiation control unit 111 controls infrared light irradiation of the infrared light irradiation unit 103. The exposure control unit 112 controls an exposure time in the image sensor 200. The details of operations of the infrared light irradiation control unit 111 and the exposure control unit 112 will be described below.

The IR separation and removal unit 130 separates and removes an image signal (IR signal) corresponding to infrared light from the image signals ($R_{+IR}$, $G_{+IR}$, $B_{+IR}$, and $W_{+IR}$ signals) including an infrared light signal. The IR separation and removal unit 130 processes an image signal equivalent to two frames related to the same pixels output by the image signal acquisition unit 120. Then, the separated IR signal, the R signal, the G signal, the B signal, and the W signal are output.

The interpolation unit 114 performs an interpolation process on the R, G, B, and W signals separated by the IR separation and removal unit 130. Here, the interpolation process is a process of interpolating data of an image signal deficient at a pixel position and generating R, G, B, and W signals for all the pixels. In the interpolation process, a known processing method can be used. For example, when an R signal is generated in a pixel which is a target of the interpolation process, a method of setting an average value of image signals of neighboring R pixels as an R signal of the pixel can be used.

The color signal correction unit 115 performs white balance adjustment and gamma correction on the R, G and B signals. In addition, the white balance adjustment is a process of adjusting a white subject so that the R, G and B signals have the same signal level. The gamma correction is a process of correcting the R, G and B signals along a gamma curve.

The YC conversion unit 116 converts the R, G, B, and W signals into a luminance signal (Y) and color-difference signals (Cb and Cr) through numerical calculation. In the numerical calculation, known arithmetic equations can be used. For example, the following equations can be used:

$$Y=W;$$

$$Cb=-0.16874\times R-0.33126\times G+0.50000\times B;\text{ and}$$

$$Cr=0.50000\times R-0.41869\times G-0.08131\times B,$$

where W indicates a W signal.

The correction unit 117 corrects the luminance signal and the color-difference signal in accordance with the IR signal. The correction unit 117 increases levels of the luminance signal and the color-difference signal by adding the IR signal to the luminance signal and the color-difference signal while maintaining color balance. Thus, it is possible to supply an image with high visibility. In the correction, a known correction method can be used. For example, the correction can be performed using the following correction equations:

$$Y'=Y+k1\times IR;$$

$$Cb'=Cb+k2\times IR;\text{ and}$$

$$Cr'=Cr+k3\times IR,$$

where Y', Cb', and Cr' indicate a luminance signal Y, a color-difference signal Cb, and a color-difference signal Cr after the correction, respectively. IR indicates an IR signal. Further, k1, k2, and k3 are coefficients.

Figure 3:
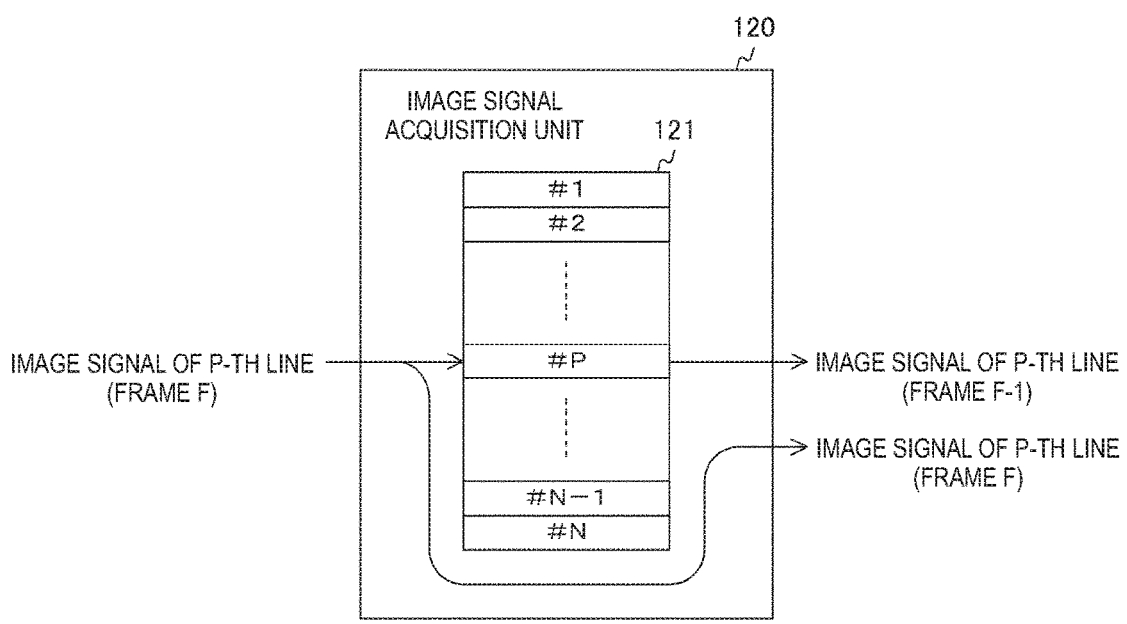
FIG. 3 is a diagram illustrating a process of an image signal acquisition unit 120 according to the first embodiment of the present technology.

FIG. 3 is a diagram illustrating a process of the image signal acquisition unit 120 according to the first embodiment of the present technology. Here, the image signal acquisition unit 120 acquires an image signal output by the image sensor 200. The image signal acquisition unit 120 includes a frame memory 121 that retains an image signal equivalent to one frame and outputs an image signal of a current frame output by the image sensor 200 and an image signal one frame before in the same pixel. In addition, in FIG. 3, the number of lines of a frame in the image sensor 200 is assumed to be N. Also, focusing on a P-th line, the image sensor 200 is assumed to output an image signal of the P-th line in a frame F which is a current frame. Also, in FIG. 3, a frame F−1 indicates a frame one frame before the frame F. Then, when the image signal of the P-th line is input from the image sensor 200, the image signal acquisition unit 120 simultaneously outputs the image signal of the P-th line of the frame F and an image signal of a P-th line of the frame F−1. To realize this, the image signal acquisition unit 120 extracts and outputs an image signal from a previous frame in the frame memory 121, and subsequently retains the image signal in the current frame in the frame memory 121. In addition, the YC conversion unit 116 is an example of a conversion unit described in the claims.

Figure 4:
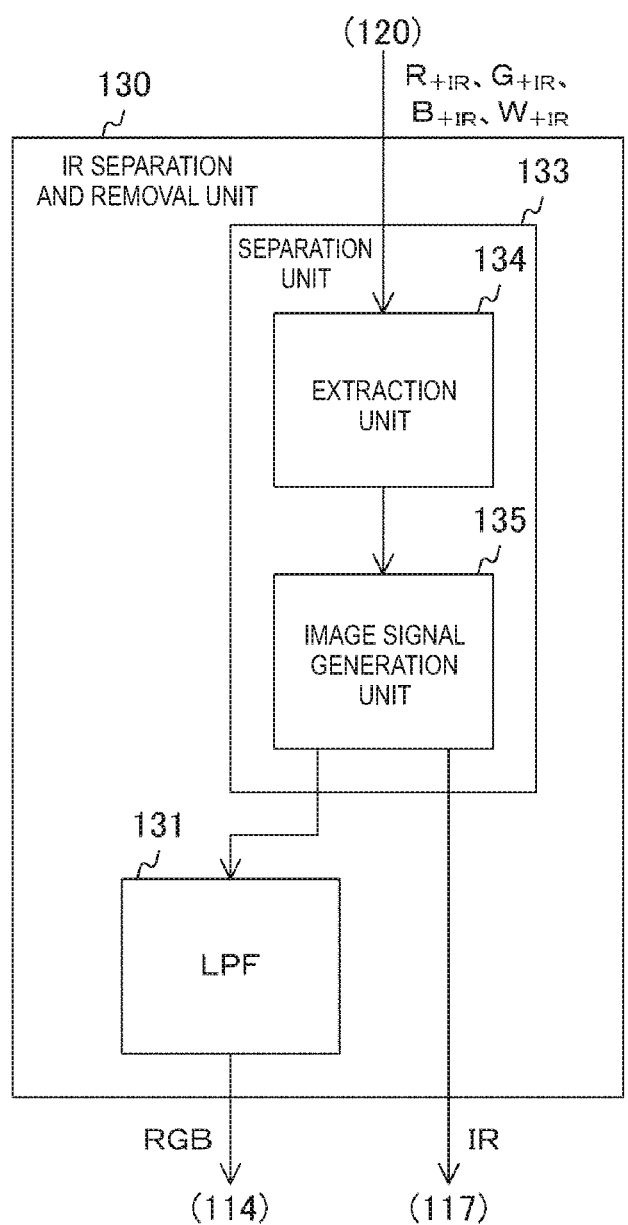
FIG. 4 is a diagram illustrating an example of a configuration of an IR separation and removal unit 130 according to the first embodiment of the present technology.

FIG. 4 is a diagram illustrating an example of a configuration of the IR separation and removal unit 130 according to the first embodiment of the present technology. The IR separation and removal unit 130 includes a separation unit 133 and a lowpass filter (LPF) 131.

The separation unit 133 separates image signals (R, G, B, and W signals) including no infrared light signal and an IR signal from the image signals ($R_{+IR}$, $G_{+IR}$, $B_{+IR}$, and $W_{+IR}$ signals) including the infrared light signal. The separation unit 133 includes an extraction unit 134 and an image signal generation unit 135. The extraction unit 134 extracts a visible light intensity per unit time and an infrared light intensity per unit time from an image signal including an infrared light signal. Also, the image signal generation unit 135 generates R, G, B, and W signals and an IR signal from the visible light intensity per unit time and the infrared light intensity per unit time. The details of the extraction unit 134 and the image signal generation unit 135 will be described below. In addition, the image signal generation unit 135 is an example of a generation unit described in the claims.

The LPF 131 is a lowpass filter that decreases a high-frequency signal included in an image signal in order to remove noise. For example, a 2-dimensional noise reduction circuit can be used as the LPF 131.

[Control of Image Sensor]

Figure 5:
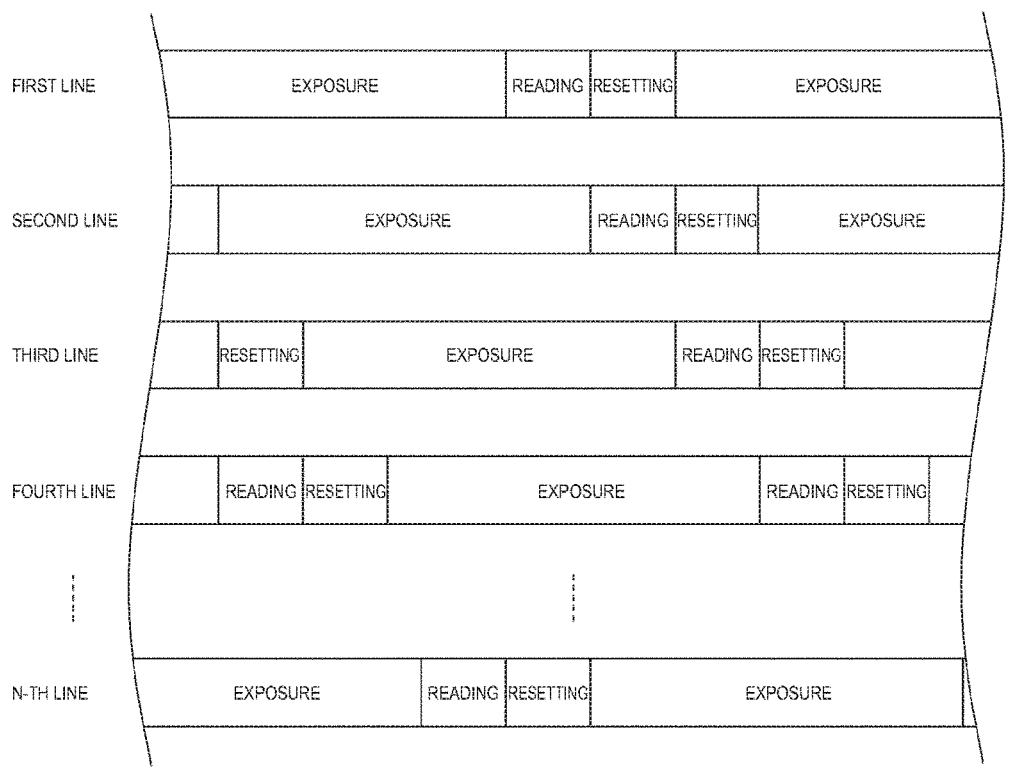
FIG. 5 is a diagram illustrating an operation of an image sensor 200 according to the first embodiment of the present technology.

FIG. 5 is a diagram illustrating an operation of an image sensor 200 according to the first embodiment of the present technology. The image sensor 200 according to the first embodiment of the present technology is a CMOS image sensor and performs an operation in accordance with a rolling shutter technique. The rolling shutter technique is a technique in which a series of operations of resetting, exposure and reading are sequentially performed line by line, as illustrated in FIG. 5. Also, the image sensor 200 sets an exposure time by causing a period from reading to subsequent reading in one line to be constant and controlling the timing from exposure start to exposure stop. This is equivalent to control of the timing from resetting to reading in FIG. 5. This control is performed by the exposure control unit 112. Specifically, the image sensor 200 can set the reset timing from the outside. The resetting is sequentially performed for each line in accordance with the set timing so that a predetermined exposure time can be obtained. The exposure control unit 112 controls the exposure time of the image sensor 200 by changing the setting of the reset timing. FIG. 5 illustrates an example of a case in which resetting is performed immediately after reading and a maximum exposure time is set. In addition, the image sensor 200 reads image data in each line after the exposure time elapses and outputs the image data to the image processing device 110.

Figure 6:
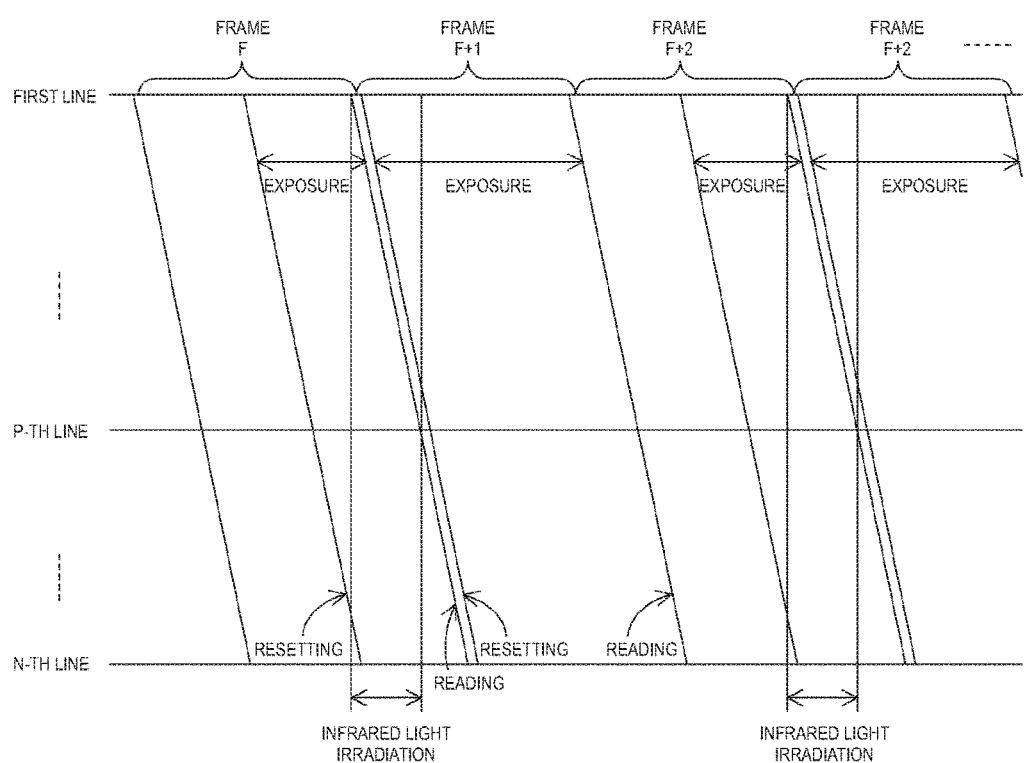
FIG. 6 is a diagram illustrating a relation between a frame and an exposure time according to the first embodiment of the present technology.

FIG. 6 is a diagram illustrating a relation between a frame and an exposure time according to the first embodiment of the present technology. The image sensor 200 has N lines and alternately repeats a frame with a short exposure time and a frame with a long exposure time. Here, the short exposure time is referred to as a first exposure time and the long exposure time is referred to as a second exposure time. Also, a frame in which the first exposure time is set is referred to as a first frame and a frame in which the second exposure time is set is referred to as a second frame. In FIG. 6, a frame F and a frame F+2 are equivalent to the first frame and a frame F+1 is equivalent to the second frame. In addition, the exposure control unit 112 rewrites setting of the above-described reset timing and switches the first and second exposure times when a frame is switched.

Also, a subject is irradiated with infrared light for a period in which the first frame is switched to the second frame. This is performed when the infrared light irradiation control unit 111 controls the infrared light irradiation unit 103. For example, the following method can be used as a control method by the infrared light irradiation control unit 111. First, when an elapsed time from start of the first frame is measured by a timer and the infrared light irradiation start timing comes, the infrared light irradiation unit 103 is caused to start infrared light irradiation. Thereafter, when an elapsed time from start of the second frame is similarly measured and the infrared light irradiation stop timing comes, the infrared light irradiation unit 103 is caused to stop the infrared light irradiation.

Figure 7A:
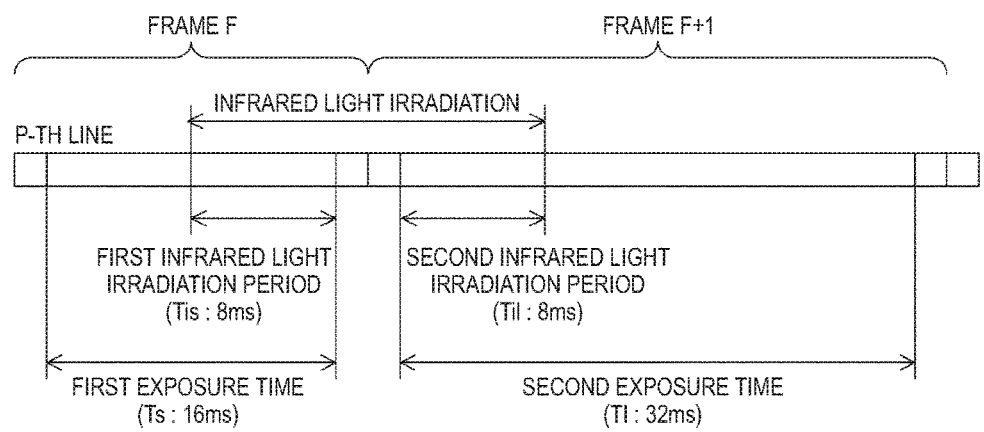
FIGS. 7A and 7B are diagrams illustrating a relation between an exposure time and an infrared light irradiation period according to the first embodiment of the present technology.
Figure 7B:
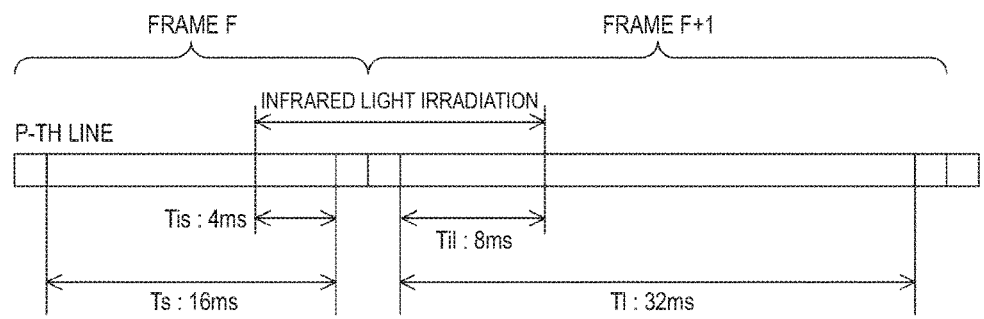

FIGS. 7A and 7B are diagrams illustrating a relation between an exposure time and an infrared light irradiation period according to the first embodiment of the present technology. In FIG. 7a, a relation between an exposure time and an infrared light irradiation period of the P-th line in FIG. 6 is illustrated. Here, a period overlapping the first exposure time in the infrared light irradiation period is referred to as a first infrared light irradiation period and a period overlapping the second exposure time in the infrared light irradiation period is referred to as a second infrared light irradiation period. As these periods, for example, the first exposure time (Ts) can be set to 16 ms, the second exposure time (Tl) can be set to 32 ms, the first infrared light irradiation period (Tis) can be set to 8 ms, and the second infrared light irradiation period (Til) can be set to 8 ms. These periods are set by the exposure control unit 112 and the infrared light irradiation control unit 111 within the range in which a normal image signal can be obtained without saturation of an image signal from the image sensor 200. In addition, an image signal in the first frame is referred to as a first image signal and an image signal of the same line as the first image signal in the second frame is referred to as a second image signal.

[Generation of Image Signal Corresponding to Visible Light and Image Signal Corresponding to Infrared Light]

In FIG. 7A, when Rs is an image signal at the time of the frame F, that is, the first image signal, and Rl is an image signal at the time of the frame F+1, that is, the second image signal, the following relations are satisfied between Rs and Rl and Ts, Tl, Tis, and Til:

$$Rs = r \times Ts + ir \times Tis \quad \text{(Equation 1); and}$$

$$Rl = r \times Tl + ir \times Til \quad \text{(Equation 2),}$$

where r is the visible light intensity per unit time and ir is the infrared light intensity per unit time. Also, it is assumed that r and ir, for the most part, do not change in the frames F and F+1. Ts and Tl are known values. Tis and Til are also values which can be calculated from a start time of infrared light irradiation, the length of a irradiation period with respect to a start time of the frame F. Accordingly, r and ir can be calculated by causing the foregoing Equations 1 and 2 to be simultaneous. The extraction unit 134 calculates r and ir.

In addition, it is necessary to set an exposure time and an infrared light irradiation period so that a ratio of Ts to Tis and a ratio of Tl to Til are different values. This is because r and it may not be calculated from Equations 1 and 2 when these ratios are equal. For example, illustrated in FIG. 7B corresponds to a case in which Ts is set to 16 ms, Tl is set to 32 ms, Tis is set to 4 ms, and Til is set to 8 ms. Accordingly, in a line in which such conditions are satisfied, it is necessary to perform a process (interpolation process) or the like of setting an average value of r and ir in previous and subsequent lines as r and ir of the line.

Next, an image signal corresponding to the visible light and an image signal corresponding to the infrared light are generated from r and ir. Since r is a visible light intensity per unit time, the image signal corresponding to the visible light can be generated by multiplying r by Ts or Tl. Similarly, since ir is an infrared light intensity per unit time, the image signal corresponding to the infrared light can be generated by multiplying ir by Tis or Til. The generation is performed by the image signal generation unit 135. In this way, separation of the infrared light signal is realized by generating the image signal corresponding to the visible light signal from the image signal including the infrared light signal.

[Imaging Procedure]

Figure 8:
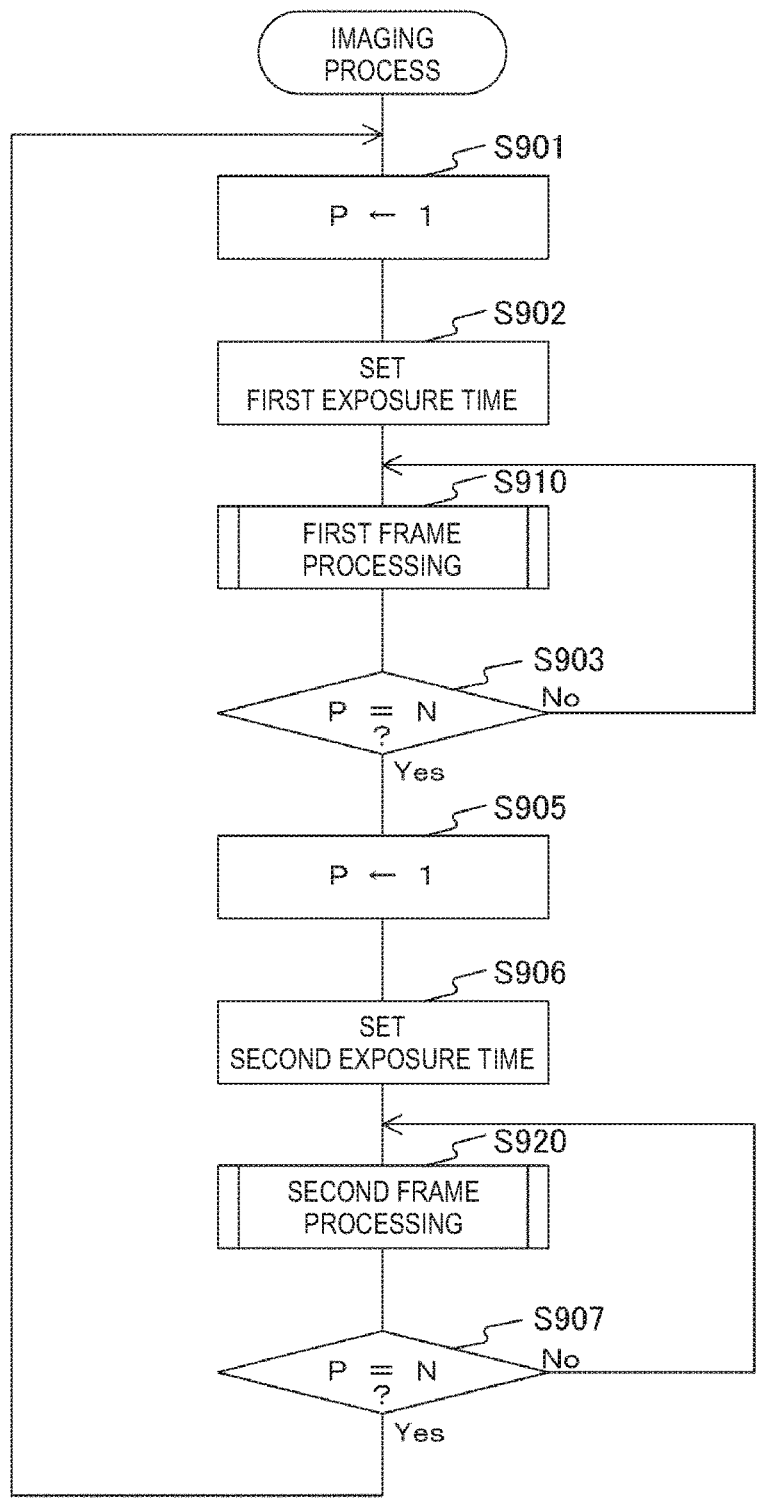
FIG. 8 is a diagram illustrating an example of an imaging process procedure according to the first embodiment of the present technology.

FIG. 8 is a diagram illustrating an example of an imaging process procedure according to the first embodiment of the present technology. In an imaging process according to the first embodiment of the present technology, a variable P indicating a current operation target line number is used. First, the image processing device 110 sets 1 for the variable P (step S901). Next, the image processing device 110 sets the first exposure time in the image sensor 200 (step S902) and performs first frame processing (step S910). When the variable P is not N as a result (No in step S903), the image processing device 110 performs the process of step S910 again. When the variable P is N (Yes in step S903), the image processing device 110 moves the process to a process of step S905 and sets 1 for the variable P (step S905). Next, the image processing device 110 sets the second exposure time in the image sensor 200 (step S906) and performs second frame processing (step S920). When the variable P is not N as a result (No in step S907), the image processing device 110 performs the process of step S920 again. When the variable P is N (Yes in step 907), the image processing device 110 performs the process again from step S901.

Figure 9:
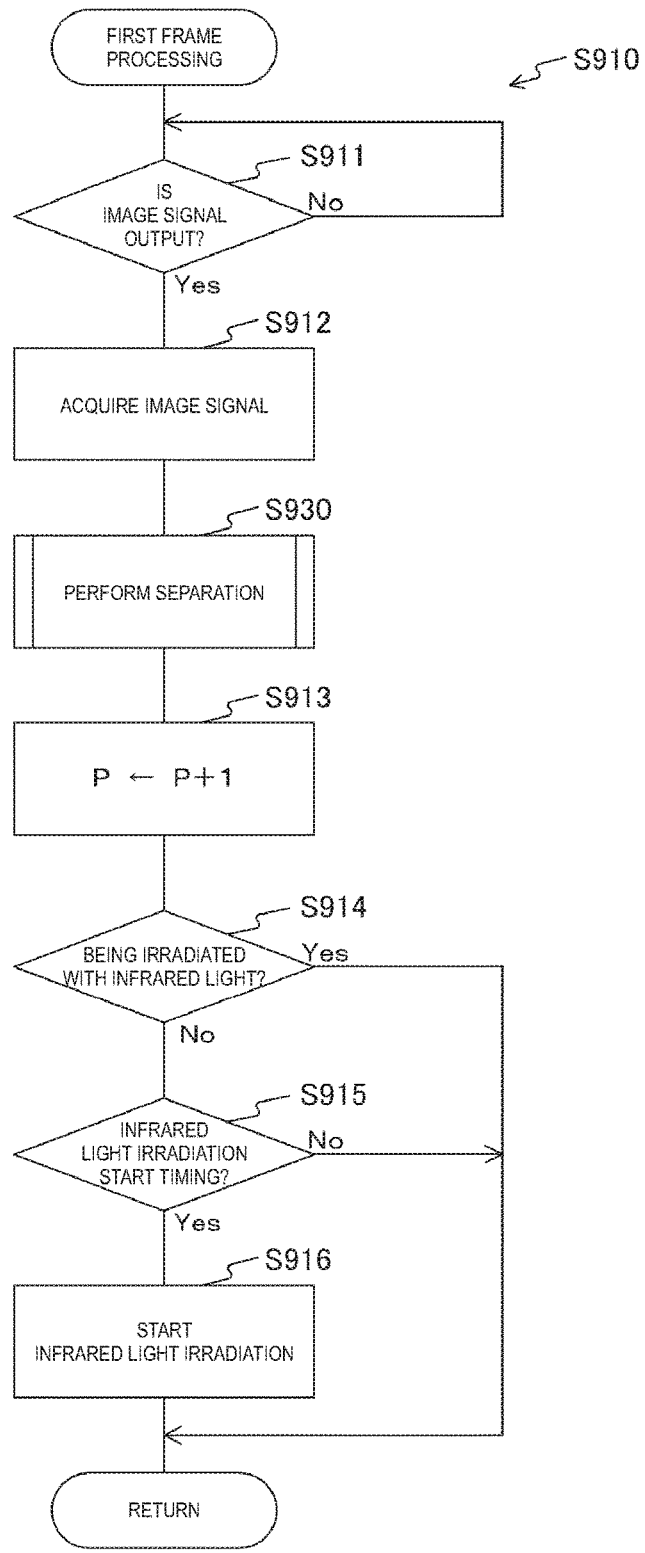
FIG. 9 is a diagram illustrating an example of a first frame processing procedure according to the first embodiment of the present technology.

FIG. 9 is a diagram illustrating an example of a first frame processing procedure according to the first embodiment of the present technology. First, the image processing device 110 waits until an image signal of a line corresponding to the variable P is output from the image sensor 200 (step S911). When the image signal is output (Yes in step S911), the image signal acquisition unit 120 acquires the image signal (step S912) and outputs the image signal and an image signal of a line P one frame before. Further, the image signal is retained in the frame memory 121. Next, the image processing device 110 performs a separation process (step S930) to separate the infrared light signal from the image signal. Next, the image processing device 110 increments the variable P (step S913). Next, when the infrared light irradiation control unit 111 does not perform the infrared light irradiation (No in step S914) and an infrared light irradiation start timing comes (Yes in step S915), the image processing device 110 causes the infrared light irradiation unit 103 to start the infrared light irradiation (step S916). Thereafter, the image processing device 110 ends the first frame processing. Conversely, when the infrared light irradiation is already being performed (Yes in step S914) or the infrared light irradiation start timing does not come (No in step S915), the image processing device 110 does not perform any process and ends the first frame processing.

Figure 10:
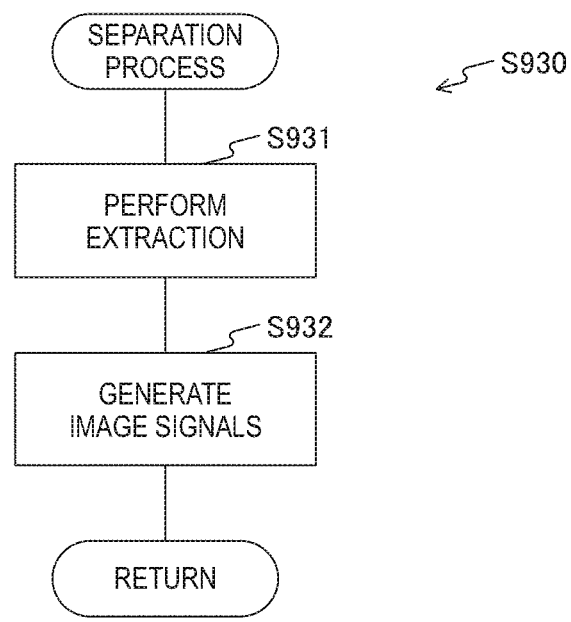
FIG. 10 is a diagram illustrating an example of a separation processing procedure according to the first embodiment of the present technology.

FIG. 10 is a diagram illustrating an example of a separation processing procedure according to the first embodiment of the present technology. First, the image processing device 110 causes the extraction unit 134 to extract the visible light intensity per unit time and the infrared light intensity per unit time from the image signal (step S931). Next, the image processing device 110 causes the image signal generation unit 135 to generate the image signal corresponding to the visible light and the image signal corresponding to the infrared light from the extracted visible light intensity per unit time and the extracted infrared light intensity per unit time (step S932). Thereafter, the image processing device 110 ends the process.

Figure 11:
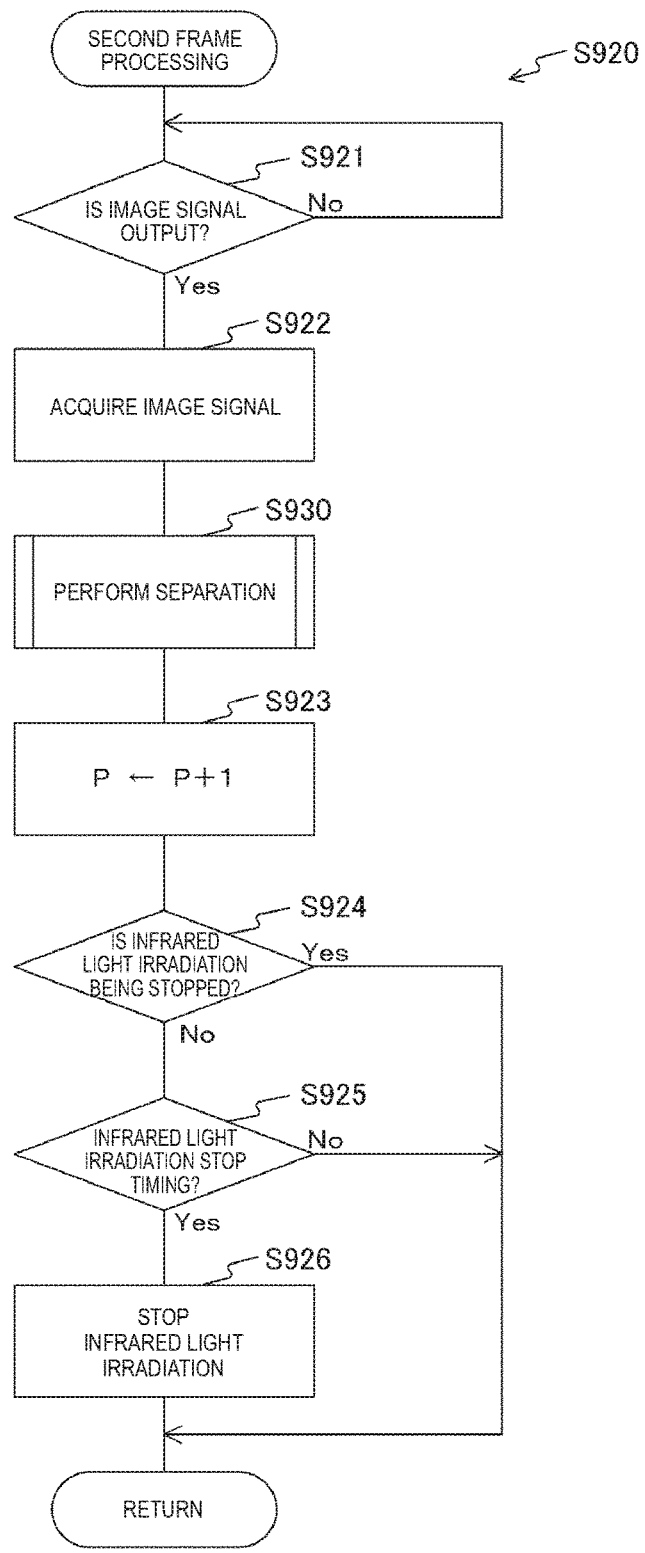
FIG. 11 is a diagram illustrating an example of a second frame processing procedure according to the first embodiment of the present technology.

FIG. 11 is a diagram illustrating an example of a second frame processing procedure according to the first embodiment of the present technology. First, the image processing device 110 waits until an image signal of a line corresponding to the variable P is output from the image sensor 200 (step S921). When the image signal is output (Yes in step S921), the image signal acquisition unit 120 acquires the image signal (step S922). Next, the image processing device 110 performs a separation process (step S930) to separate the infrared light signal from the image signal. Next, the image processing device 110 increments the variable P (step S923). Next, when the infrared light irradiation control unit 111 performs the infrared light irradiation (No in step S924) and the infrared light irradiation stop timing comes (Yes in step S925), the image processing device 110 causes the infrared light irradiation unit 103 to stop the infrared light irradiation (step S926). Thereafter, the image processing device 110 ends the second frame processing. Conversely, when the infrared light is already being stopped (Yes in step S924) or the infrared light irradiation stop timing does not come (No in step S925), the image processing device 110 does not perform any process and ends the second frame processing.

In this way, according to the first embodiment of the present technology, even when the imaging is performed while performing the infrared light irradiation through the calculation of the image signals in which the exposure time and the infrared light irradiation time are different, the visible light and the infrared light can be appropriately separated from an image signal formed by the visible light and the infrared light.

2. Second Embodiment

In the above-described first embodiment, the image sensor in which an operation time per line is constant is used. On the other hand, in a second embodiment of the present technology, an image sensor in which an operation time per line can be changed in accordance with an exposure time is used.

[Control of Image Sensor]

Figure 12:
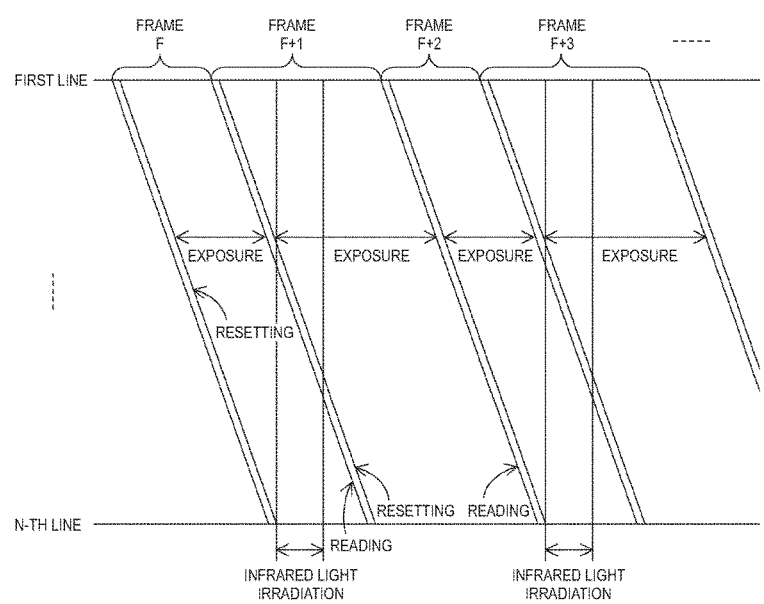
FIG. 12 is a diagram illustrating a relation between a frame and an exposure time according to a second embodiment of the present technology.

FIG. 12 is a diagram illustrating a relation between a frame and an exposure time according to a second embodiment of the present technology. The image sensor 200 according to the second embodiment of the present technology is an image sensor for a rolling shutter technique as in the first embodiment of the present technology. However, a period from resetting to reading, that is, an operation time per line in a frame, can be changed in accordance with the exposure time. Here, a period from reading to subsequent reading of an image signal in one line is referred to as an operation time per line. Since the first exposure time is shorter than the second exposure time, an operation time per line in a first frame is also shorter. Therefore, a period of frames F and F+2 which is a first frame period in FIG. 12 is shorter than a period of frames F+1 and F+3 which is a second frame period. In addition, the operation time per line is limited by a data reading time from the image sensor, but the image sensor 200 according to the second embodiment of the present technology realizes a short operation time by simultaneously reading image signals equivalent to two lines. Thus, in the second embodiment of the present technology, it is possible to increase a frame frequency in the second frame and improve image quality.

[Configuration of Image Processing Device or the Like]

The image processing device 110 according to the second embodiment of the present technology can be configured similarly to the image processing device 110 described in FIG. 2. However, it is necessary to simultaneously process image signals equivalent to two lines. Therefore, for example, the image signal acquisition unit 120 is configured such that the frame memory 121 has two screens for the first and second frames. Then, the image signals are configured to be read and output from frame memories while dividing and preserving image signals equivalent to two lines in the frame memories. Since the other remaining configurations of the image processing device 110 and the imaging device 100 are the same as those of the image processing device 110 and the imaging device 100 described in the first embodiment of the present technology, the description thereof will be omitted.

In this way, according to the second embodiment of the present technology, it is possible to increase the frame frequency by changing the operation time per line in accordance with the exposure time and improve the image quality.

3. Modification Examples

First Modification Example

In the above-described first embodiment, an image sensor for a rolling shutter technique is used as the image sensor 200, but a CCD image sensor which is an image sensor for a global shutter technique may be used. In this case, when the exposure control unit 112 inputs a signal causing the image sensor 200 to perform a reset operation, the exposure time is set so that there is a predetermined exposure time. Since the other remaining configurations of the image processing device 110 and the imaging device 100 are the same as those of the image processing device 110 and the imaging device 100 described in the first embodiment of the present technology, the description thereof will be omitted. In this way, according to the first modification example of the present technology, even when a CCD image sensor is used, the visible light and the infrared light can be appropriately separated from the image signals formed by the visible light and the infrared light.

Second Modification Example

In the above-described first embodiment, in the image sensor 200, the $R_{+IR}$, $G_{+IR}$, $B_{+IR}$, and $W_{+IR}$ pixels are disposed. However, an image sensor in which $R_{+IR}$, $G_{+IR}$, and $B_{+IR}$, pixels are disposed in a Bayer array may be used as the image sensor 200. In this case, the YC conversion unit 116 can perform calculation based on the following equations:

$Y = 0.29891 \times R + 0.58661 \times G + 0.11448 \times B;$ $Cb = -0.16874 \times R - 0.33126 \times G + 0.50000 \times B;$ and $Cr = 0.50000 \times R - 0.41869 \times G - 0.08131 \times B.$ Also, in the above-described first embodiment, the image sensor 200 that has sensitivity for both the visible light and the infrared light is used. However, electromagnetic waves with different frequencies may be combined. For example, the visible light and ultraviolet light or the visible light and X rays may be combined.

Since the other remaining configurations of the image processing device 110 and the imaging device 100 are the same as those of the image processing device 110 and the imaging device 100 described in the first embodiment of the present technology, the description thereof will be omitted.

As described above, according to the embodiments of the present technology, even when the imaging is performed while performing the infrared light irradiation, the visible light and the infrared light can be appropriately separated from the image signals formed by the visible light and the infrared light.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An image processing device including:

an exposure control unit configured to control timing from exposure start to exposure stop of an image sensor which outputs an image signal of a subject and to alternately repeat a first frame in which an exposure time is set to a predetermined first exposure time and a second frame in which the exposure time is set to a second exposure time longer than the first exposure time;

an infrared light irradiation control unit configured to irradiate the subject with infrared light in a predetermined infrared light irradiation period which is shorter than or equal to an aggregate period of the first frame and the second frame;

an image signal acquisition unit configured to acquire a first image signal which is the image signal in the first frame and a second image signal which is the image signal in the second frame;

an extraction unit configured to extract a visible light intensity per unit time and an infrared light intensity per unit time from the first image signal and the second image signal; and a generation unit configured to generate an image signal corresponding to visible light and an image signal corresponding to the infrared light on the basis of the extracted visible light intensity per unit time and the extracted infrared light intensity per unit time.

(2)

The image processing device according to (1), wherein, when a period in which an exposure period overlaps the infrared light irradiation period in the first frame is a first infrared light irradiation period and a period in which the exposure period overlaps the infrared light irradiation period in the second frame is a second infrared light irradiation period, a ratio of the first exposure time to the first infrared light irradiation period is different from a ratio of the second exposure time to the second infrared light irradiation period.

(3)

The image processing device according to (1) or (2), further including:

a conversion unit configured to convert the image signal corresponding to the visible light into a luminance signal and a color signal; and a correction unit configured to correct the luminance signal and the color signal in accordance with the image signal corresponding to the infrared light.

(4)

The image processing device according to any one of (1) to (3), wherein the image signal of the subject includes an image signal corresponding to red light and the infrared light, an image signal corresponding to green light and the infrared light, and an image signal corresponding to blue light and the infrared light, and a separation unit separates the image signal corresponding to the infrared light, an image signal corresponding to the red light, an image signal corresponding to green light, and an image signal corresponding to blue light.

(5)

The image processing device according to (4), wherein the image sensor further includes an image signal corresponding to white light and the infrared light, and the separation unit separates the image signal corresponding to the infrared light, the image signal corresponding to the red light, the image signal corresponding to the green light, the image signal corresponding to the blue light, and an image signal corresponding to the white light.

(6)

An imaging device including:

an image processing device including an image sensor configured to output an image signal of a subject, an infrared light irradiation unit configured to irradiate the subject with infrared light, an exposure control unit configured to control timing from exposure start to exposure stop of the image sensor and to alternately repeat a first frame in which an exposure time is set to a predetermined first exposure time and a second frame in which the exposure time is set to a second exposure time longer than the first exposure time, an infrared light irradiation control unit configured to cause the infrared light irradiation unit to perform irradiation of the infrared light in a predetermined infrared light irradiation period which is shorter than or equal to an aggregate period of the first frame and the second frame, an image signal acquisition unit configured to acquire a first image signal which is the image signal in the first frame and a second image signal which is the image signal in the second frame, an extraction unit configured to extract a visible light intensity per unit time and an infrared light intensity per unit time from the first image signal and the second image signal, and a generation unit configured to generate an image signal corresponding to visible light and an image signal corresponding to the infrared light on the basis of the extracted visible light intensity per unit time and the extracted infrared light intensity per unit time.

(7) An imaging method including:

an exposure control procedure of controlling timing from exposure start to exposure stop of an image sensor which outputs an image signal of a subject and alternately repeating a first frame in which an exposure time is set to a predetermined first exposure time and a second frame in which the exposure time is set to a second exposure time longer than the first exposure time;

an infrared light irradiation control procedure of irradiating the subject with infrared light in a predetermined infrared light irradiation period which is shorter than or equal to an aggregate period of the first frame and the second frame;

an image signal acquisition procedure of acquiring a first image signal which is the image signal in the first frame and a second image signal which is the image signal in the second frame;

an extraction procedure of extracting a visible light intensity per unit time and an infrared light intensity per unit time from the first image signal and the second image signal; and a generation procedure of generating an image signal corresponding to visible light and an image signal corresponding to the infrared light on the basis of the extracted visible light intensity per unit time and the extracted infrared light intensity per unit time.

REFERENCE SIGNS LIST 100 imaging device
101 lens
102 image output unit
103 infrared light irradiation unit
110 image processing device
111 infrared light irradiation control unit
112 exposure control unit
114 interpolation unit
115 color signal correction unit
116 YC conversion unit
117 correction unit
120 image signal acquisition unit
121 frame memory
130 IR separation and removal unit
131 LPF
133 separation unit
134 extraction unit
135 image signal generation unit
200 image sensor

The invention claimed is:

1. An image processing device, comprising:
an exposure control unit configured to:
control timing from exposure start to exposure stop of an image sensor which outputs an image signal of a subject; and
alternately repeat a first frame in which an exposure time is set to a first exposure time and a second frame in which the exposure time is set to a second exposure time longer than the first exposure time, wherein a difference between a time of start of the second frame and a reset time in the second frame, is smaller than a difference between a time of start of the first frame and a reset time in the first frame;
an infrared light irradiation control unit configured to irradiate the subject with infrared light in an infrared light irradiation period, wherein the infrared light irradiation period is one of shorter than or equal to an aggregate period of the first frame and the second frame;
an image signal acquisition unit configured to acquire a first image signal which is an image signal in the first frame, and a second image signal which is an image signal in the second frame;
an extraction unit configured to extract a visible light intensity per unit time and an infrared light intensity per unit time from the first image signal and the second image signal; and
a generation unit configured to generate an image signal corresponding to visible light and an image signal corresponding to the infrared light based on the extracted visible light intensity per unit time and the extracted infrared light intensity per unit time.

2. The image processing device according to claim 1, wherein
a period in which an exposure period overlaps with the infrared light irradiation period in the first frame is a first infrared light irradiation period,
a period in which the exposure period overlaps with the infrared light irradiation period in the second frame is a second infrared light irradiation period, and
a ratio of the first exposure time to the first infrared light irradiation period is different from a ratio of the second exposure time to the second infrared light irradiation period.

3. The image processing device according to claim 1, further comprising:
a conversion unit configured to convert the image signal corresponding to the visible light into a luminance signal and a color signal; and
a correction unit configured to correct the luminance signal and the color signal, based on the image signal corresponding to the infrared light.

4. The image processing device according to claim 1, further comprising a separation unit, wherein
the image signal of the subject includes an image signal corresponding to red light and the infrared light, an image signal corresponding to green light and the infrared light, and an image signal corresponding to blue light and the infrared light, and
the separation unit is configured to separate the image signal corresponding to the infrared light from each of the image signal corresponding to the red light and the infrared light, the image signal corresponding to the green light and the infrared light, and the image signal corresponding to the blue light and the infrared light to obtain
an image signal corresponding to the red light,
an image signal corresponding to the green light, and
an image signal corresponding to the blue light.

5. The image processing device according to claim 4, wherein
the image sensor further includes an image signal corresponding to white light and the infrared light, and
the separation unit is further configured to separate the image signal corresponding to the infrared light from the image signal corresponding to the white light and the infrared light to obtain an image signal corresponding to the white light.

6. An imaging device, comprising:
an image processing device that includes:
an image sensor configured to output an image signal of a subject;
an infrared light irradiation unit configured to irradiate the subject with infrared light;

an exposure control unit configured to:
  control timing from exposure start to exposure stop of the image sensor; and
  alternately repeat a first frame in which an exposure time is set to a first exposure time and a second frame in which the exposure time is set to a second exposure time longer than the first exposure time, wherein
    a difference between a time of start of the second frame and a reset time in the second frame, is smaller than a difference between a time of start of the first frame and a reset time in the first frame;
an infrared light irradiation control unit configured to control the infrared light irradiation unit to irradiate the subject with the infrared light in an infrared light irradiation period, wherein the infrared light irradiation period is one of shorter than or equal to an aggregate period of the first frame and the second frame;
an image signal acquisition unit configured to acquire a first image signal which is an image signal in the first frame, and a second image signal which is an image signal in the second frame;
an extraction unit configured to extract a visible light intensity per unit time and an infrared light intensity per unit time from the first image signal and the second image signal; and
a generation unit configured to generate an image signal corresponding to visible light and an image signal corresponding to the infrared light based on the extracted visible light intensity per unit time and the extracted infrared light intensity per unit time.

7. An imaging method, comprising:
controlling timing from exposure start to exposure stop of an image sensor which outputs an image signal of a subject;
alternately repeating a first frame in which an exposure time is set to a first exposure time and a second frame in which the exposure time is set to a second exposure time longer than the first exposure time, wherein
  a difference between a time of start of the second frame and a reset time in the second frame, is smaller than a difference between a time of start of the first frame and a reset time in the first frame;
irradiating the subject with infrared light in an infrared light irradiation period, wherein the infrared light irradiation period is one of shorter than or equal to an aggregate period of the first frame and the second frame;
acquiring a first image signal which is an image signal in the first frame, and a second image signal which is an image signal in the second frame;
extracting a visible light intensity per unit time and an infrared light intensity per unit time from the first image signal and the second image signal; and
generating an image signal corresponding to visible light and an image signal corresponding to the infrared light based on the extracted visible light intensity per unit time and the extracted infrared light intensity per unit time.

8. The image processing device according to claim 1, wherein the infrared light irradiation period is a period in which the first frame is switched to the second frame.

9. The image processing device according to claim 1, wherein the first exposure time is between the reset time in the first frame and a reading time in the first frame.

* * * * *